United States Patent [19]

Forward et al.

[11] 4,199,989
[45] Apr. 29, 1980

[54] COLD DAMPING OF MECHANICAL STRUCTURES

[75] Inventors: Robert L. Forward, Oxnard; Robert W. Peterson, Sepulveda, both of Calif.

[73] Assignee: Hughes Aircraft Company, Culver City, Calif.

[21] Appl. No.: 943,280

[22] Filed: Sep. 18, 1978

[51] Int. Cl.² .................................. G01D 11/10
[52] U.S. Cl. ........................................ 73/430
[58] Field of Search ......... 73/570, 579, 430, DIG. 10; 310/51

[56] References Cited
U.S. PATENT DOCUMENTS

| | | | |
|---|---|---|---|
| 3,143,883 | 8/1964 | Nakasone | 73/430 |
| 3,436,967 | 4/1969 | Post | 73/430 |
| 3,813,946 | 6/1974 | Robbins et al. | 73/430 |
| 4,066,958 | 1/1978 | Burke | 73/430 |

*Primary Examiner*—Anthony V. Ciarlante
*Attorney, Agent, or Firm*—Don O. Dennison; W. H. MacAllister

[57] ABSTRACT

Methods and apparatus are disclosed for substantially reducing the effect of the inherent transducer capacitance in a transducer-coupled electromechanical system which is subject to vibrational movement. First and second electromechanical transducers, mechanically coupled to the mechanical structure are interconnected by an electronic feedback network. The feedback network is characterized by very low input and output impedances thus overcoming the shunting effects of the inherent transducer capacitance. In preferred embodiments the feedback network is "electronically cooled" thereby providing low-noise damping.

8 Claims, 4 Drawing Figures

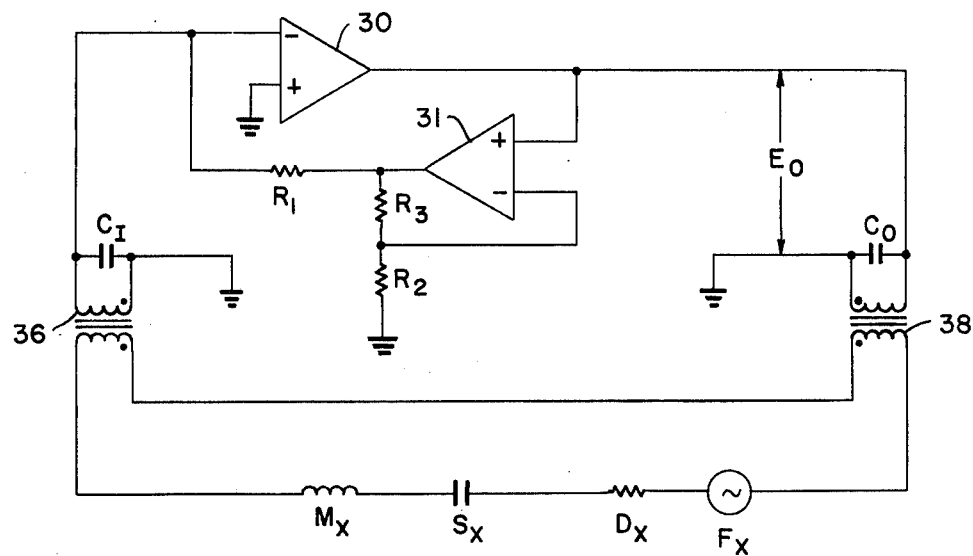
Fig. 3.
Fig. 4.
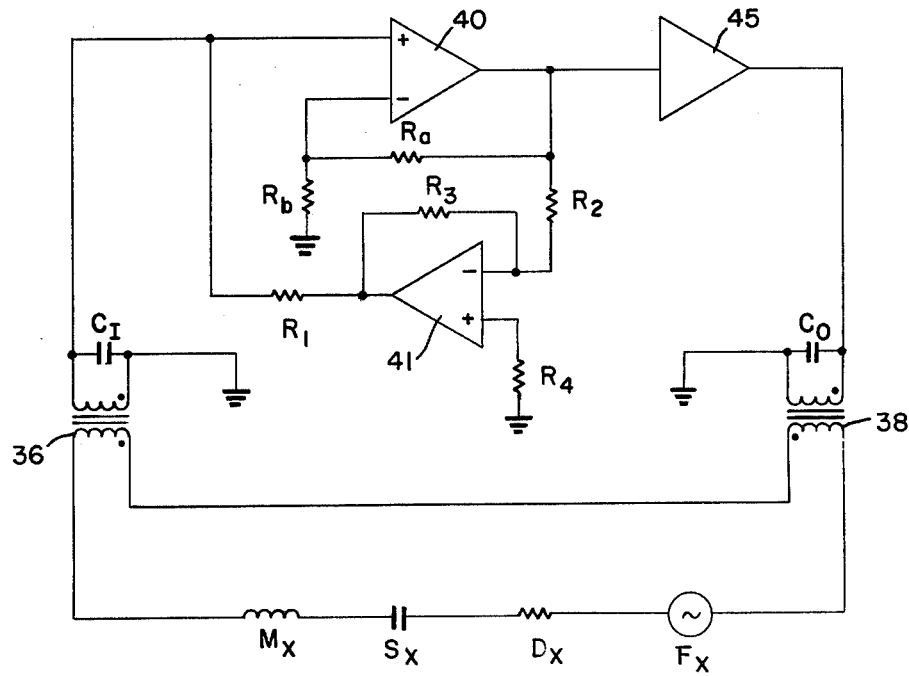

COLD DAMPING OF MECHANICAL STRUCTURES

FIELD OF THE INVENTION

This invention relates to electromechanical transducer-coupled vibrating mechanical structures, and more particularly, it relates to arrangements for compensating for the inherent transducer capacitance of such structures.

BACKGROUND OF THE INVENTION

A significant source of error in high precision mechanical and electromechanical structures is vibration. Antennas, optical structures, pointing and tracking systems, seeker heads, gravitational and inertial sensors, and guidance platforms can suffer a degradation in performance from external excitation by the local acoustic and vibrational environment.

In the past, the effects of externally induced vibrations in large mechanical structures have been mitigated by such brute-force techniques as stiffening the structure, adding massive mechanical dampers, covering the structure with viscoelastic damping material, or adding acoustic shielding and vibration isolators to shield the structure from the environment.

Another approach to mitigating the aforementioned vibration effects involves electronically damping or controlling the vibrations. In order to accomplish this, an electromechanical transducer, such as a piezoelectric strain transducer, is mounted on the vibrating mechanical structure to provide an electrical signal responsive to the vibrational motion of the structure. This electrical signal may be either applied to a damping resistor connected across the transducer output terminals or fed to electronic processing circuitry for developing an appropriate control signal which is fed back to the mechanical structure by means of another electromechanical transducer. Regardless of the particular approach employed, the inherent capacitance of the signal-extracting transducer significantly limits the degree of coupling to the external electronic circuitry. This, in turn, limits the degree of electronic damping or control which may be achieved.

In the co-pending application of R. L. Forward, Ser. No. 901,550 filed on May 1, 1978 now abandoned, an arrangement is disclosed for tuning out the inherent shunt capacitance of the transducer by connecting across the transducer output an inductor which provides the appropriate inductance to resonate with the transducer capacitance. Such an arrangement is highly effective in eliminating the effect of the transducer capacitance at vibration frequencies in the vicinity of the inductance-capacitance resonant frequency, although its effectiveness is reduced as the vibration frequency departs from the resonant frequency.

Another technique for compensating for such transducer capacitance is disclosed in the co-pending application of R. L. Forward, Ser. No. 904,169, filed May 8, 1978 now U.S. Pat. No. 4,158,787, and also assigned to the present assignee. In this latter application, a negative capacitance circuit is placed across the transducer to provide broadband cancellation of the shunting effect of the transducer capacitance. With the inherent transducer shunting capacitance thus cancelled, substantially all of the transducer current may be coupled through a damping resistor placed across the transducer. By this means, high levels of damping can be achieved for many vibrational modes simultaneously.

It is a general object of the present invention to minimize the effects of vibrations in mechanical and electromechanical structures.

It is another object of the present invention to reduce the effects of inherent transducer capacitance in a transducer-coupled electromechanical system over a wide range of vibrational frequencies.

It is a further object of the present invention to provide improved feedback damping utilizing circuits which simulate low-noise temperature resistances.

SUMMARY OF THE INVENTION

In accordance with the present invention these objects are accomplished by use of two electromechanical transducers coupled to the mechanical structure, the vibrations of which are to be damped. The transducers are electrically connected by means of a feedback circuit having very low input and output impedances. The input to the feedback circuit includes an operational amplifier operating in the so-called "current input mode" so that the input impedance of the op-amp is lower than the shunting impedance resulting from the inherent transducer capacitance. The second electromechanical transducer, connected mechanically in parallel with the first transducer is driven by the amplifier output voltage to produce a counteracting force (or torque in a rotational system) proportional to the velocity of the mechanical vibration being sensed by the input transducer.

The op-amp utilizes in its own feedback network an "absorbor" or active circuit which simulates a low noise-temperature resistance. Thus, electronic damping is obtainable with very low levels of excess noise while also overcoming the shunting effects of the inherent transducer capacitances.

BRIEF DESCRIPTION OF THE DRAWINGS

In order that the invention may be clearly understood and readily carried into effect, it will now be described with reference by way of example, to the accompanying drawings, wherein like reference numerals denote like elements and in which:

FIG. 3 is a schematic diagram of one preferred embodiment of the present invention and FIG. 4 is a schematic diagram of another preferred embodiment of the present invention.

DESCRIPTION OF THE PREFERRED EMBODIMENTS

Figure 1:
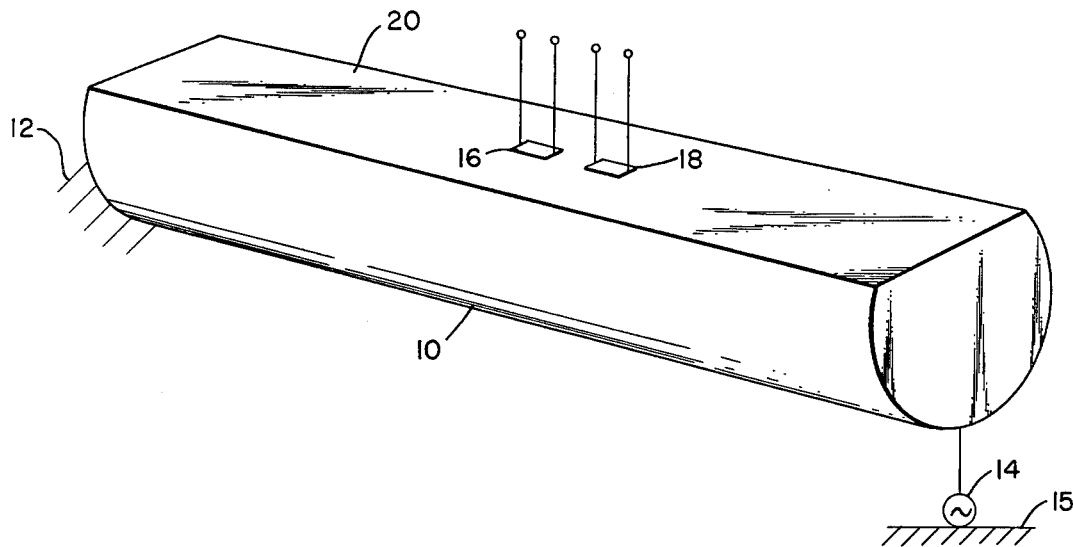
FIG. 1 is a perspective representation of a resonant mechanical system useful in explaining the principles of the present invention.

In FIG. 1, there is shown, for the purpose of explanation, a simplified perspective view of a resonant mechanical system with which the present invention may be employed. In FIG. 1 a bar 10 is utilized as an example of an elastic mechanical structure which is subject to vibration. In practice, bar 10 can be, for example, a portion of an optical structure or other structure, the vibrations of which are required to be damped. One end of bar 10 is mounted to a wall 12. The other end of bar 10 is coupled through an exciter 14 or other source of mechanical vibration to support 15. Exciter 14 may have an indirect coupling such as an acoustical coupling or, alternatively, the vibration of bar 10 may be derived from vibration of wall 12 or from a device mounted on bar 10. For the purposes of the present explanation, the dimensions of the bar and the other mechanical parameters of the structure of FIG. 1 are unimportant. In any event, a similar structure is specified with greater particularity in the above-mentioned co-pending application Ser. No. 901,550.

The structure of FIG. 1 includes a pair of electromechanical transducers 16 and 18 which are bonded or otherwise mechanically secured to the flattened top surface 20 of bar 10. In general, transducers 16 and 18 can be fabricated of barium titanate ceramic piezoelectric material, or other suitable piezoelectric material well-known in the art. In general, the volume and mass of transducers 16 and 18 are very much smaller than the corresponding volume and mass of bar 10. Each of the transducers 16 and 18 is provided with a pair of leads to facilitate coupling to the circuitry described hereinbelow.

Figure 2:
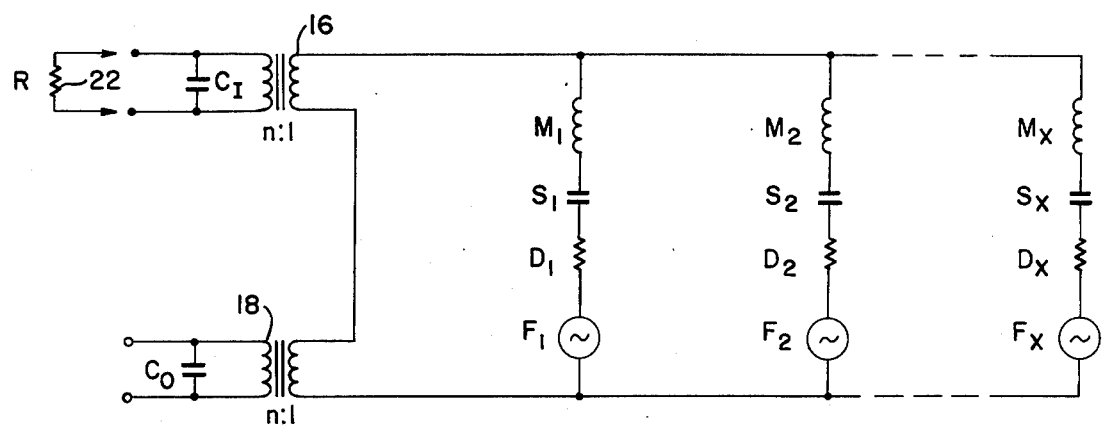
FIG. 2 is a schematic diagram of the equivalent electrical analog of the mechanical system of FIG. 1.

Turning now to FIG. 2, there is shown a schematic representation of the electrical analog of the mechanical system of FIG. 1. It is assumed that a number of resonant modes exist in the structure of FIG. 1. These resonant modes are depicted by the plural parallel RLC circuits. The piezoelectric transducers 16 and 18 have been replaced with equivalent transformers having turns ratios of n:1 and inherent capacitances depicted as $C_I$ and $C_O$ across their respective output windings. For the first resonant mode an inductance $M_1$, capacitance $S_1$, resistance $D_1$, and voltage $F_1$, represent the effective mass, spring constant, damping and force noise of the first resonant mode. In general, for each of the resonant modes there is associated with it these various constants. Thus the series RLC circuit comprising $M_x$, $S_x$, $D_x$ and $F_x$ depicts the parameters of the Xth resonant mode of the system.

In the past, one method of damping the vibrations of a structure such as that shown in FIG. 1, and FIG. 2 has been the addition of a damping resistor R shown as 22 across the terminals of transducer 16. If it were not for the effective transducer capacitance $C_I$, the damping resistor 22 would be effectively inserted in series with the damping $D_x$ in each of the vibrational modes thus providing simultaneous damping for all. However, in typical situations, the reactance of the inherent transducer capacitance $C_I$ (or $C_O$) is much less than the damping resistance R which is required for high damping. In other words, the effective transducer capacitive reactance shorts out the damping resistor. In FIG. 3 there is shown a schematic diagram of a preferred embodiment of the present invention. An input transducer 36 with its corresponding inherent capacitance $C_I$ and an output transducer with its corresponding inherent capacitance $C_O$ are connected mechanically in parallel and electrically in series. A first differential input operational amplifier 30 is connected with its inputs across the secondary of transducer 36. The ground referenced output of op-amp 30 is connected across transducer 38. A feedback network comprising a second op-amp 31 and interconnected resistors $R_1$, $R_2$ and $R_3$ are provided between the output of op-amp 30 and its inverting input terminal. The feedback network, as will be explained in greater detail hereinbelow constitutes an "absorbor".

The primaries of the transformer analogies 36 and 38 of transducers 16 and 18 are connected in series with the effective mass $M_x$, spring constant $S_x$, damping $D_x$ and noise force $F_x$ of the Xth vibrational mode. For the sake of clarity, only the analogous parameters of the Xth mode are shown. It is understood, however, that many vibrational modes may be, and generally are, present and that the relative masses, spring constants, damping and vibrational amplitudes for the several modes are unequal.

When an analysis of the feedback circuit of FIG. 3 is made, it is found that the combination of op-amp 31 and interconnected resistors $R_1$, $R_2$ and $R_3$ constitute an "absorbor". Such circuits, which simulate low-noise temperature resistors are disclosed in the copending application of Robert L. Forward and Gary D. Thurmond, Ser. No. 881,296, filed Feb. 27, 1978. If then this combination of elements is regarded as a passive resistor of value $R_{eq}$ then op-amp 30 is seen to be connected in its current input mode as a "current-to-voltage" transducer. As such, the output voltage $E_O$ is equal to the equivalent feedback resistance times the input current. That is:

$$E_O = -I_{in} R_{eq} \quad [1]$$

$$E_O = -R_{eq}(dQ/dt). \quad [2]$$

Such a current-to-voltage transducer arrangement is characterized by extremely low input and output impedances. In operation then, the circuit of FIG. 3 converts the input charge rate or current $dQ/dt$ into a proportional voltage $E_O$ while, because of the low input impedance, simultaneously forcing the input transducer voltage to remain near zero. This combined action results in an amplifier output voltage $E_O$ which is directly proportional to the velocity of the mechanical mode being sensed by input transducer 36. The output transducer 38 connected in mechanical parallel to the input transducer is driven by the amplifier output voltage $E_O$ to produce a force (or torque, in a rotation system) proportional to the velocity of the sensed mechanical mode. This action provides control of the damping of the vibrational mode.

By proper design of the feedback circuit the required damping can be obtained with low noise. In the case of the embodiment of FIG. 3 the "absorbor" circuit comprising op-amp 31 and resistors $R_1$, $R_2$ and $R_3$ comprises a low noise-temperature resistance. The design of such circuits is given in the co-pending application of R. L. Forward and G. D. Thurmond, Ser. No. 881,296.

If the resistors of the embodiment of FIG. 3 are selected so that:

$$R_1 \triangleq \left[1 + \frac{R_3}{R_2}\right] R_{eq} \quad [3]$$

and since, typically, $R_3 >> R_2$ $$R_1 \approx [R_3/R_2] R_{eq} \quad [4]$$

when the constraint is imposed, the circuit of FIG. 3 is characterized by an equivalent resistance $R_{eq}$ at an equivalent temperature $T_{eq}$ defined in terms of the ambient temperature $T_{amb}$:

$$T_{eq} = \left[\frac{R_2}{R_2 + R_3} + \frac{R_3}{R_1}\right] T_{amb} \quad [5]$$

If $R_1 >> R_3 >> R_2$, then Equation [5] reduces to:

$$T_{eq} \approx [R_2/R_3]T_{amb} \quad [6]$$

Thus, the equivalent temperature of the active damping circuit of FIG. 3 can be made much lower than the ambient temperature.

As implied, hereinabove, the analysis of the present invention has assumed the existence and utilization of ideal circuit elements. Such ideal elements, of course, can only be approximated in practice. Because of the necessary use of non-ideal circuit elements potential stability problems may be manifest in the operation of the circuit of FIG. 3. Specifically, the inherent cut-off characteristics of operational amplifiers 30 and 31 and the lag produced by the RC network comprising $R_1$ and $C_I$ may limit circuit performance under certain operational regimes. This difficulty can be overcome by the proper design of equalization networks within op-amp 30.

This potential difficulty can be alleviated by means of the circuit of FIG. 4. In FIG. 4 the first op-amp 40 is connected in a non-inverting amplifier configuration with its non-inverting input being connected to input transducer 36. The inverting input of op-amp 40 is connected through a resistor $R_b$ to ground. A first feedback path for op-amp 40 is provided by means of resistor $R_a$ connected between the op-amp output and inverting input terminals. A second feedback path is provided by means of a second operational amplifier 41 and the serial combination of resistors $R_2$ and $R_1$. As shown in FIG. 4, the output of op-amp 40 is coupled to the inverting input of op-amp 41 through resistor $R_2$. The non-inverting input of op-amp 41 is grounded through $R_4$. The output of op-amp 41 is connected to the non-inverting input of the first op-amp 40 through a resistor $R_1$. The gain of op-amp 41 is established by means of resistor $R_3$ connected between the output and inverting input.

The output of op-amp 49 is connected through an optional amplifier 45 to one end of driving transducer 38. As before, the other sides of transducers 36 and 38 are connected to ground potential. In the case of the embodiment of FIG. 4, transducers 36 and 38, although electrically in series, are 180° out of phase as indicated by the dot convention on the equivalent transformer representation. This reversal of transducer connection is necessitated by the operation of op-amp 40 in its non-inverting mode instead of the inverting mode of FIG. 3.

Amplifier 45 in series with the output of op-amp 40 provides additional driving power for transducer 38. In general amplifier 45 can comprise any one of a number of suitable low-noise amplifiers known in the art. In instances where the output of op-amp 40 is sufficient to provide the required drive power for transducer 38, amplifier 45 can be omitted.

As seen in the embodiment of FIG. 4 each of the operational amplifiers 40 and 41 is characterized by distinct and individual closed feedback loops. The cut-off character of the outer loop is established by the amplifier gains and by the lag of the RC network including resistor $R_1$ and transducer capacitance $C_I$.

If the following design constraints are imposed, the equivalent resistance and equivalent temperature of the circuit of FIG. 4 can be specified. Specifically, if:

$$R_1 = \left[ \frac{R_b}{R_a + R_b} + \frac{R_3}{R_2} \right] R_{eq}, \quad [7]$$

and if $R_3 >> R_2$ and $R_a >> R_b$, then:

$$R_1 \approx [R_3/R_2]R_{eq}. \quad [8]$$

With the imposition of these constraints the equivalent "cold resistance" of the circuit of FIG. 4 is found to have an equivalent temperature of $$T_{eq} \approx \left[ \frac{R_3}{R_2} + \frac{R_2 + R_3}{R_1} \right] T_{amb} \quad [9]$$

or if $R_1 >> R_3 >> R_2$ $$T_{eq} \approx [R_2/R_3]T_{amb} \quad [10]$$

In all cases, it is understood that the above-described arrangements are merely illustrative of but a few of the many possible specific embodiments which can represent applications of the principles of the present invention. Numerous and varied other arrangements can be readily devised in accordance with these principles by those skilled in the art without departing from the spirit and scope of the invention.

What is claimed is:

1. In an electromechanical system including a mechanical member which is subject to vibrational movement, first and second electromechanical transducers mounted on said member, said first electromechanical transducer being capable of providing an electrical charge having a rate of change proportional to the velocity of said mechanical member, said second electromechanical transducer being capable of imparting a motion to said member in response to an electrical voltage applied thereto, circuit means being connected between said first and second transducers said circuit means including a current-to-voltage transducer, said current-to-voltage transducer comprising a differential-input operational amplifier operating in the current input mode and having a low noise-temperature feedback circuit.

2. The system according to claim 1 wherein said first and second electromechanical transducers are connected electrically in series and mechanically in parallel.

3. The system according to claim 1 wherein the input impedance of said current-to-voltage transducer is substantially less than equivalent capacitive reactance of said first electromechanical transducer over the frequencies of operation.

4. The system according to claim 1 wherein said feedback network includes a second differential-input operational amplifier.

5. In an electromechanical system including a mechanical member which is subject to vibrational movement, first and second electromechanical transducers mounted on said member, said first electromechanical transducer being capable of generating an electrical charge having a charge rate of change proportional to the velocity of said mechanical member, said second electromechanical transducer being capable of imparting a motion to said member in response to an electrical voltage applied thereto, circuit means being connected between said first and second transducers said circuit means including a differential-input operational amplifier operating in the current input mode and including a feedback network which simulates a low-temperature resistor.

6. The system according to claim 5 wherein said first and second electromechanical transducers are connected electrically in series and mechanically in parallel.

7. The system according to claim 5 wherein the input impedance of said operational amplifier is substantially less than the equivalent capacitive reactance of said first electromechanical transducer over the frequencies of operation.

8. The system according to claim 5 wherein said feedback network includes a second differential-input operational amplifier.

* * * * *